(12) United States Patent
Kikkawa (10) Patent No.: US 10,306,096 B2
(45) Date of Patent: May 28, 2019

(54) IMAGE FORMING SYSTEM SELECTING PLURALITY OF IMAGE PARTS OBTAINED BY DIVIDING ORIGINAL IMAGE DATA ON BASIS OF HISTORY OF POSITION INFORMATION OF WEARABLE DEVICE, AND FORMING IMAGE

(71) Applicant: KYOCERA Document Solutions Inc., Osaka (JP)

(72) Inventor: Toru Kikkawa, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/850,471

(22) Filed: Dec. 21, 2017

(65) Prior Publication Data
US 2018/0183971 A1    Jun. 28, 2018

(30) Foreign Application Priority Data

Dec. 28, 2016    (JP) .................. 2016-256861

(51) Int. Cl.
G06F 3/12      (2006.01)
H04N 1/00      (2006.01)
H04N 1/32      (2006.01)
A63F 13/50     (2014.01)
A63F 13/92     (2014.01)
(Continued)

(52) U.S. Cl.
CPC ....... *H04N 1/32122* (2013.01); *A63F 13/216* (2014.09); *A63F 13/327* (2014.09);
(Continued)

(58) Field of Classification Search
CPC .............. A63F 13/216; G06K 15/1859; H04N 1/32545
See application file for complete search history.

(56) References Cited

U.S. PATENT DOCUMENTS

2006/0092462 A1*  5/2006  Mokuya ............... G06F 3/124
                                                358/1.15
2010/0238491 A1   9/2010  Shiimori et al.
(Continued)

FOREIGN PATENT DOCUMENTS

EP    2961150 A2       12/2015
JP    2006146781 A *    6/2006
JP    2007-148532 A     6/2007

OTHER PUBLICATIONS

Extended European Search Report dated Apr. 20, 2018 mailed in the corresponding European Patent Application No. 17209665.3.

*Primary Examiner* — Nicholas Pachol
(74) *Attorney, Agent, or Firm* — IP Business Solutions, LLC (57) ABSTRACT

An image forming system includes a plurality of image forming devices and a server device. The plurality of image forming devices and the server device are connected to one another via a network. The server device includes a position information history management unit configured to receive the position information of a wearable device through an image forming device performing short-range wireless communication with the wearable device and to manage a history of the position information of the wearable device and an image data generating unit configured to generate image data according to a history of the position information of the wearable device, and transmits image data generated by the image data generating unit to the image forming device performing short-range wireless communication with the wearable device.

4 Claims, 11 Drawing Sheets

(51) Int. Cl.
  *G07F 17/32* (2006.01)
  *A63F 13/216* (2014.01)
  *A63F 13/327* (2014.01)
(52) U.S. Cl.
  CPC .............. *A63F 13/50* (2014.09); *A63F 13/92* (2014.09); *G06F 3/1204* (2013.01); *G06F 3/126* (2013.01); *G06F 3/1288* (2013.01); *G07F 17/3255* (2013.01); *H04N 1/00127* (2013.01); *H04N 1/00307* (2013.01); *H04N 1/00323* (2013.01); *H04N 1/00344* (2013.01); *H04N 1/00347* (2013.01); *A63F 2300/203* (2013.01); *A63F 2300/8094* (2013.01); *H04N 1/00204* (2013.01); *H04N 1/00281* (2013.01); *H04N 1/00411* (2013.01); *H04N 2201/006* (2013.01); *H04N 2201/0039* (2013.01); *H04N 2201/0094* (2013.01); *H04N 2201/3205* (2013.01); *H04N 2201/325* (2013.01); *H04N 2201/3253* (2013.01)

(56) References Cited

U.S. PATENT DOCUMENTS

| | | | |
|---|---|---|---|
| 2012/0120259 A1 | 5/2012 | Sakiyama et al. | |
| 2012/0243038 A1* | 9/2012 | Saeda | G06F 3/1204 358/1.15 |
| 2013/0057903 A1* | 3/2013 | Yamazaki | G06F 3/1204 358/1.15 |
| 2013/0128306 A1* | 5/2013 | Takahashi | G06F 3/1204 358/1.15 |
| 2013/0258399 A1* | 10/2013 | Nanaumi | G06K 15/405 358/1.15 |
| 2014/0009783 A1* | 1/2014 | Chakirov | G06K 15/40 358/1.15 |
| 2014/0070002 A1* | 3/2014 | Pineau | G06K 5/00 235/382 |
| 2014/0240756 A1* | 8/2014 | Ganesan | H04W 4/029 358/1.15 |
| 2015/0002872 A1* | 1/2015 | Naruse | H04N 1/00217 358/1.13 |
| 2015/0029544 A1* | 1/2015 | Yun | G06F 3/1292 358/1.15 |
| 2015/0049359 A1* | 2/2015 | Lee | G06F 3/1292 358/1.15 |
| 2015/0378296 A1 | 12/2015 | Kim et al. | |
| 2016/0323478 A1* | 11/2016 | Tsutsumi | H04N 1/32101 |
| 2017/0085752 A1 | 3/2017 | Kim et al. | |
| 2017/0280275 A1* | 9/2017 | Nagao | H04W 76/14 |
| 2018/0101343 A1* | 4/2018 | Takahashi | G06F 3/1236 |
| 2018/0101345 A1* | 4/2018 | Nagata | G06F 3/1205 |

\* cited by examiner

| MASKED | MASKED | MASKED | MASKED |
| --- | --- | --- | --- |
| MASKED | MASKED | MASKED | MASKED |
| MASKED | MASKED | MASKED | MASKED |
| MASKED | MASKED | MASKED | MASKED |
| MASKED | MASKED | MASKED | MASKED |
| MASKED | MASKED | MASKED | MASKED |

IMAGE FORMING SYSTEM SELECTING PLURALITY OF IMAGE PARTS OBTAINED BY DIVIDING ORIGINAL IMAGE DATA ON BASIS OF HISTORY OF POSITION INFORMATION OF WEARABLE DEVICE, AND FORMING IMAGE

INCORPORATION BY REFERENCE

This application claims priority to Japanese Patent Application No. 2016-256861 filed on Dec. 28, 2016, the entire contents of which are incorporated by reference herein.

BACKGROUND

The present disclosure relates to an image forming system, and particularly, a technology for changing print content according to a geographical movement situation of a user who holds a wearable device.

Mobile terminals such as smartphones and tablet terminals, and wrist band type, eyeglass type, or earphone type wearable devices that are used while being worn by users have a function of acquiring position information of the device itself. When such a device and an image forming device such as a printer and a multifunction printer are linked, it is possible to perform print control using position information of the device. For example, there is a general print control device capable of controlling printing of a printer on the basis of position information of a device that has sent a print instruction.

SUMMARY

As an aspect of the present disclosure, a technology more improved than the above technology is proposed.

An image forming system according to an aspect of the present disclosure includes a plurality of image forming devices and a server device.

The plurality of image forming devices are distributed and disposed at sites and connected to one another via a network.

The server device is connected to the network and transmits image data to an arbitrary image forming device among the plurality of image forming devices.

The image forming devices include at least one of a display unit configured to display the image data received from the server device on a screen and a printing unit configured to print the image data on paper, and a short-range wireless communication unit configured to perform short-range wireless communication of information including position information of a wearable device with the wearable device worn by a user.

The server device includes a position information history management unit configured to receive the position information of the wearable device through an image forming device performing short-range wireless communication with the wearable device and to manage to a history of the position information of the wearable device, an image data generating unit configured to generate image data associated with the history of the position information of the wearable device, and a data communication controller configured to transmit the image data generated by the image data generating unit to the image forming device performing short-range wireless communication with the wearable device.

DETAILED DESCRIPTION

An image forming system according to an embodiment will be described below with reference to the drawings as an aspect of the present disclosure.

Figure 1:
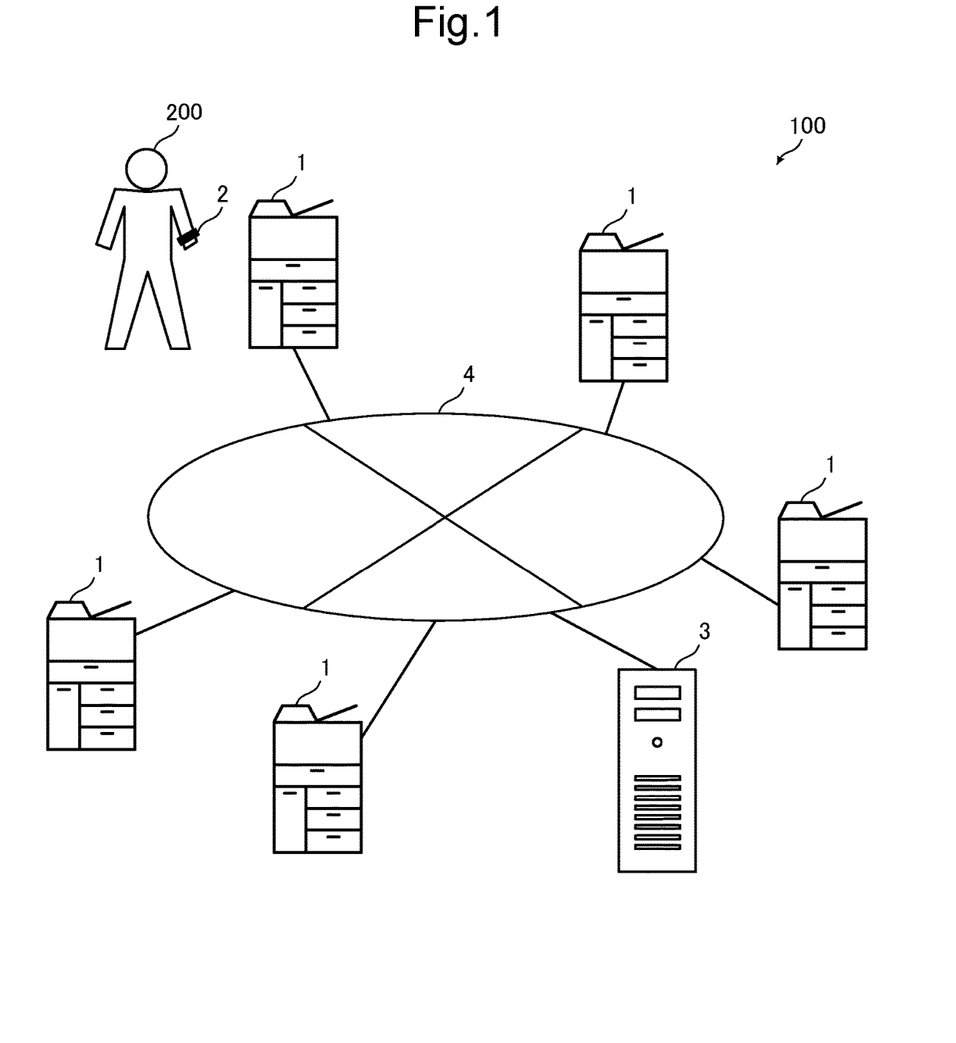
FIG. 1 is a schematic configuration diagram of an image forming system according to one embodiment of the present disclosure.

FIG. 1 is a schematic configuration diagram of the image forming system according to one embodiment of the present disclosure.

An image forming system 100 according to one embodiment of the present disclosure includes image forming devices 1, 1, ..., and a server device 3. The image forming devices 1, 1, ... and the server device 3 are connected to a network 4 such as the Internet through wired or wireless communication and can communicate with one another. The image forming devices 1, 1, ... are distributed and disposed at geographically separated sites and connected via the network 4 to one another. Here, the image forming system 100 may further include a wearable device 2 worn by a user.

Figure 2:
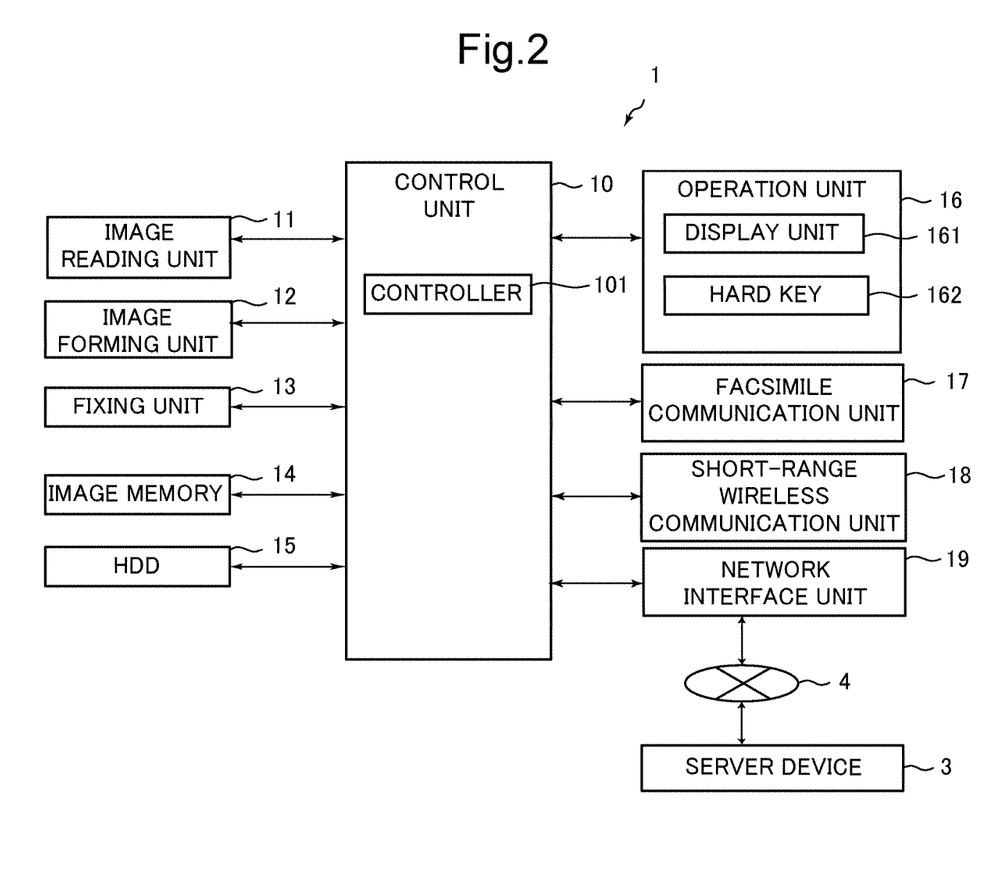
FIG. 2 is a block diagram of a main part of an image forming device.

FIG. 2 is a block diagram of a main part of the image forming device 1. The image forming device 1 is, for example, a multifunction printer (MFP) in which functions of a printer, a facsimile machine, and a scanner are integrated.

The image forming device 1 includes a control unit 10. The control unit 10 includes a central processing unit (CPU), a random access memory (RAM), a read only memory (ROM), a dedicated hardware circuit, and the like. The control unit 10 includes a controller 101 that performs overall or operation control on the image forming device 1.

An image reading unit 11 includes a reading mechanism including a light emission unit, a CCD sensor, and the like under control of the control unit 10. When the light emission unit emits light to a document and the CCD sensor receives the reflection light, the image reading unit 11 reads an image from the document.

The image forming unit 12 forms a document image read by the image reading unit 11 and an image of print data received from the server device 3 connected via the network.

A fixing unit 13 performs a fixing process in which recording paper having a surface on which an image (toner image) is formed in an image forming process of the image forming unit 12 is heated and the image is fixed to the paper by thermocompression bonding. Here, a part including the fixing unit 13 and the image forming unit 12 corresponds to a printing unit in the claims.

An image memory 14 is an area in which a document image obtained by reading by the image reading unit 11 is temporarily stored and an image formed by the image forming unit 12 is temporarily stored.

An HDD 15 is a large-capacity storage device in which the document image read by the image reading unit 11 and the like are stored.

An operation unit 16 receives an instruction regarding various operations and processes that the image forming device 1 can execute from the user. The operation unit 16 includes a touch panel type display unit 161 configured to display operation guidance and the like for the user and a plurality of hard keys 162.

A facsimile communication unit 17 includes an encoding and decoding unit, a modem unit, and a network control unit (NCU) which are not shown and performs facsimile transmission and reception using a public telephone network.

A short-range wireless communication unit 18 is a module that performs short-range wireless communication with an external device within a range of several meters (specifically, the wearable device 2 in the vicinity of the image forming device 1). For short-range wireless communication, Bluetooth (registered trademark), an Inter-Integrated Circuit (I-squared-C, $I^2C$), and the like can be used.

A network interface unit 19 includes a communication module such as a LAN board and transmits and receives various types of data to and from the server device 3 connected to the network 4 through a LAN or the like connected to the network interface unit 19.

Figure 3:
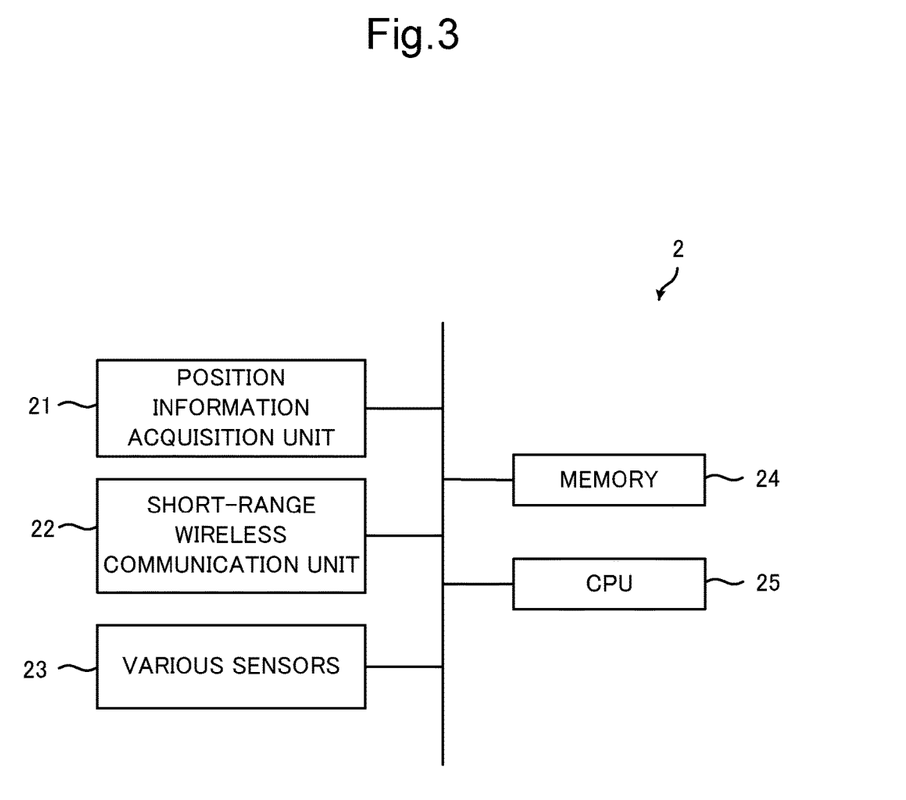
FIG. 3 is a block diagram of a main part of a wearable device.

FIG. 3 is a block diagram of a main part of the wearable device 2. The wearable device 2 is a small device that is worn by a user 200 when used. There are various types of wearable devices 2 such as a wrist band type, an eyeglass type, and an earphone type.

The wearable device 2 includes a position information acquisition unit 21, a short-range wireless communication unit 22, various sensors 23, a memory 24, a CPU 25, and the like.

The position information acquisition unit 21 is a module that receives radio waves transmitted from a plurality of Global Positioning System (GPS) satellites and acquires position information. When only radio waves from the GPS satellites are used, there is a positioning error of several tens of meters. However, when radio waves of wireless LAN access points are used in combination, the positioning error is reduced to about several meters.

The short-range wireless communication unit 22 is a module that performs short-range wireless communication with an external device within a range of several meters (specifically, the image forming device 1 in the vicinity of the wearable device 2). For short-range wireless communication, Bluetooth (registered trademark), an $I^2C$, and the like are used.

The sensors 23 are a group of various sensors provided according to an application of the wearable device 2. For example, when the wearable device 2 is used for a health care management application for the user, a heart rate sensor and a body temperature sensor are used as the various sensors 23. In addition, when the wearable device 2 is used for an activity application such as a game, an acceleration sensor, a gyro sensor, a geomagnetic sensor, an illuminance sensor, and the like are used as the various sensors 23.

The memory 24 is a storage device including a RAM, a ROM, and the like. In the memory 24, product specific information of the wearable device 2, position information acquired by a position information acquisition unit, data measured by the various sensors 23, a computer program for implementing various functions of the wearable device 2, and the like are stored.

The CPU 25 is a unit configured to control the position information acquisition unit 21, the short-range wireless communication unit 22, the various sensors 23, and the memory 24. Specifically, the CPU 25 instructs the position information acquisition unit 21 to acquire position information, stores the position information received from the position information acquisition unit 21 in the memory 24, and exchanges information with an external device through the short-range wireless communication unit 22.

Figure 4:
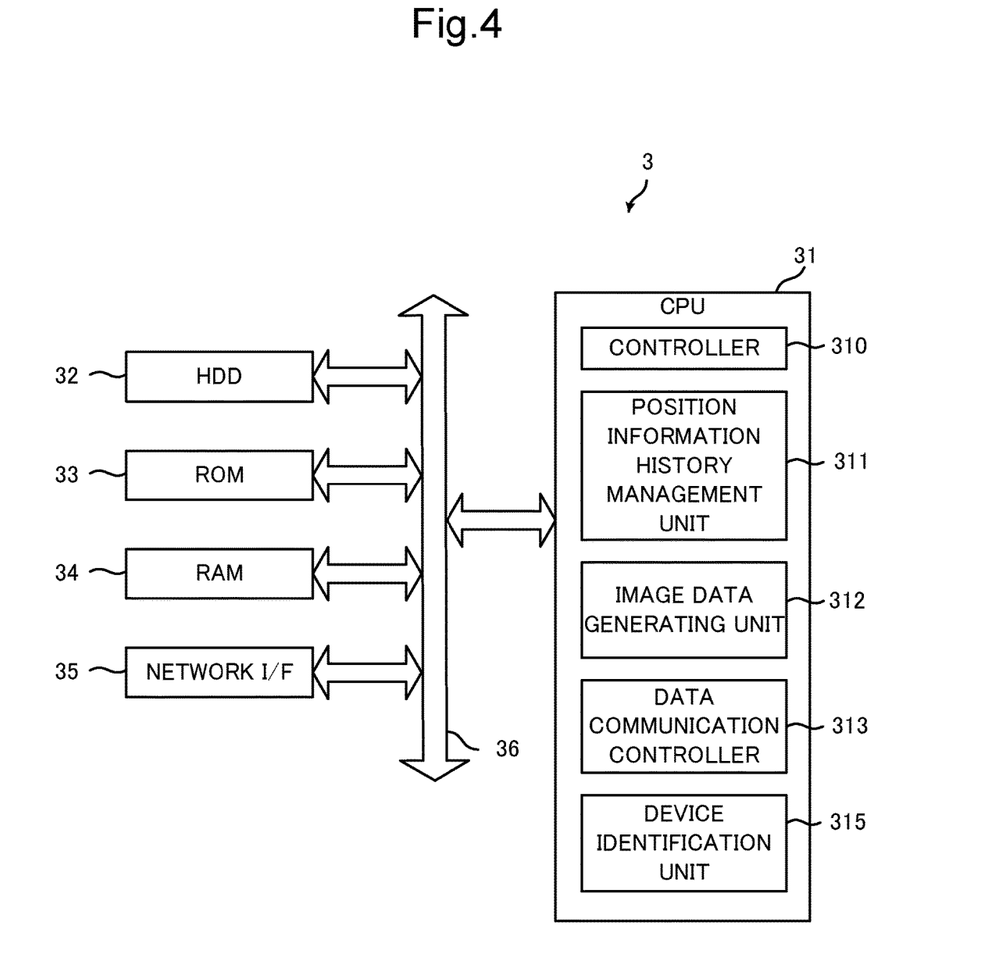
FIG. 4 is a block diagram of a main part of a server device.

FIG. 4 is a block diagram of a main part of the server device 3. The server device 3 transmits image data to an arbitrary image forming device 1 among the image forming devices 1, 1, . . . . The server device 3 may be disposed in the same LAN environment as any of the image forming devices 1, 1, . . . or may be disposed in a so-called cloud environment that is completely different from those of the image forming devices 1, 1, . . . .

The server device 3 includes a CPU 31, a hard disk device (HDD) 32, a ROM 33, a RAM 34, a network interface 35, and the like. These components are connected to one another through an internal bus 36.

For example, the CPU 31 appropriately reads and executes a communication control program stored in the HDD 32 and performs a predetermined operation. In particular, the CPU 31 operates as a controller 310, a device identification unit 315, a position information history management unit 311, an image data generating unit 312, and a data communication controller 313, which will be described below.

In the HDD 32, basic software and various types of application software executed in the CPU 31, the communication control program, system files, datafiles, and the like are stored. In the HDD 32, for example, a file in which a history of the position information of the wearable device 2 managed by the position information history management unit 311 is recorded, a file in which positions at which the image forming devices 1, 1, . . . are disposed are recorded, and the like are stored.

In the ROM 33, a program such as a BIOS executed when the server device 3 is activated is stored.

The RAM 34 functions as a work memory when the CPU 31 executes basic software or various types of application software and temporarily stores data used in various programs.

The network interface 35 is connected to the network 4 (refer to FIG. 1) and performs communication between the image forming devices 1, 1, . . . and the server device 3.

The controller 310 performs overall operation control of the server device 3.

The device identification unit 315 performs a process of identifying an image forming device that has performed short-range wireless communication with the wearable device 2 among the plurality of image forming devices 1, 1 . . . on the basis of the history of the position information of the wearable device 2.

The position information history management unit 311 receives position information of the wearable device 2 through the image forming device 1 which is performing short-range wireless communication with the wearable device 2, stores the history of the position information of the wearable device 2, and performs updating whenever new position information is acquired for management. The history of the position information of the wearable device 2 includes a date and time and information about a geographical position of the wearable device 2 at the date and time. The geographical position information is position information acquired by the position information acquisition unit 21 in the wearable device 2. The position information history management unit 311 receives position information of the wearable device 2, records the received information in the HDD 32, and thus manages the history of the position information of the wearable device 2.

The image data generating unit 312 generates image data according to the history of the position information of the wearable device 2. Specifically, original image data to be printed is stored in the HDD 32, and the original image data is divided into image parts corresponding to the image forming devices 1, 1, . . . .

The data communication controller 313 performs control such that the image forming device 1 which is performing short-range wireless communication with the wearable device 2 transmits image data generated by the image data generating unit 312 through the network interface 35.

Figure 5:
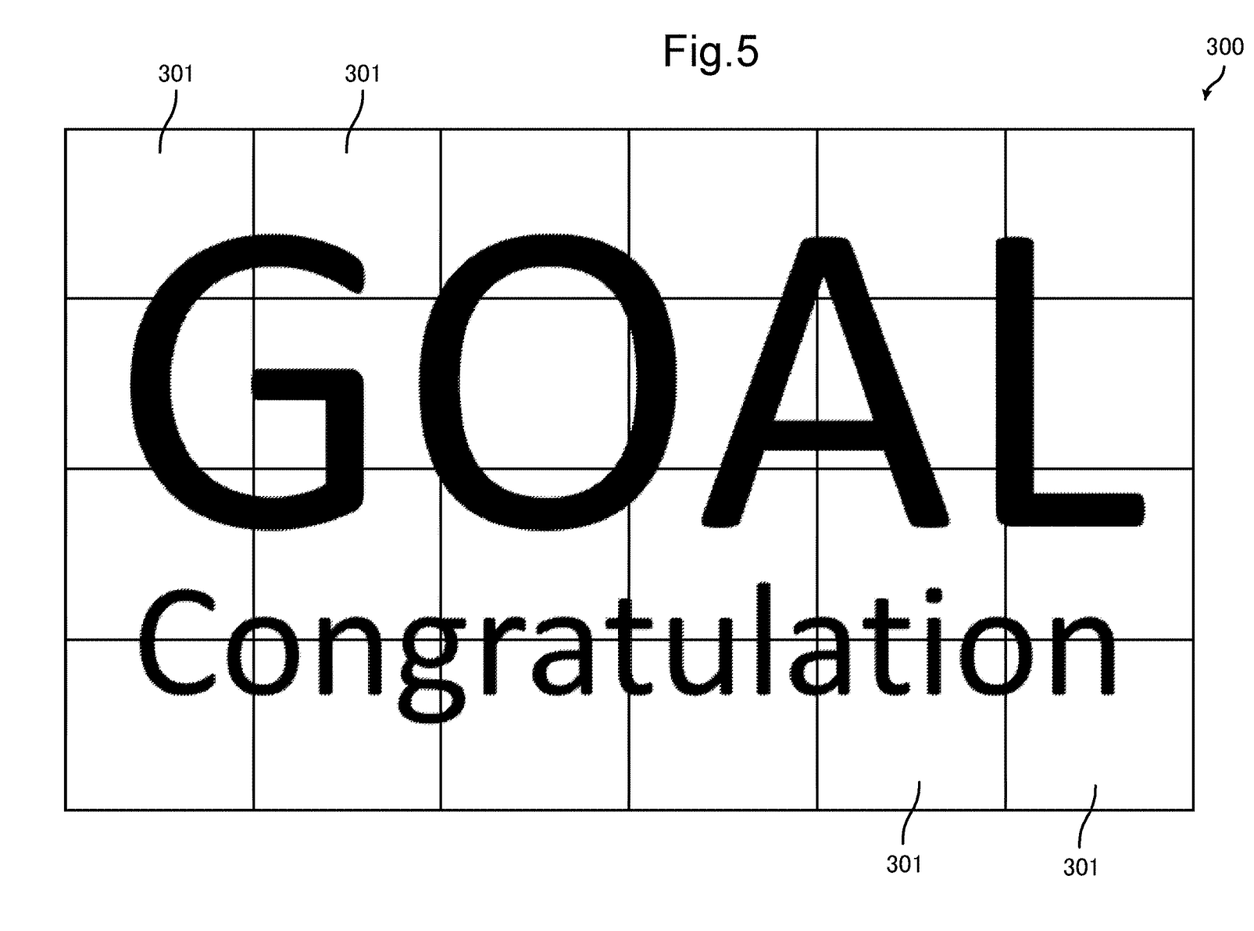
FIG. 5 is a diagram for explaining an example of original image data and image parts.

FIG. 5 is a diagram for explaining an example of original image data and image parts. For example, original image data 300 is stored in the HDD 32. The original image data 300 is divided into a plurality of image parts 301, 301, . . . (a total of 24 with 6 columns (vertical) and 4 rows (horizontal) in the example in FIG. 5), and the image parts 301, 301, . . . are associated with the image forming devices 1, 1, . . . in one-to-one correspondence and stored in the HDD 32. That is, the original image data 300 is a collection of the plurality of image parts 301, 301, . . . .

The device identification unit 315 refers to the file in which the history of the position information of the wearable device 2 stored in the HDD 32 is recorded and the file in which positions at which the image forming devices 1, 1, . . . are disposed are recorded and identifies the image forming device 1 with which the wearable device 2 has performed short-range wireless communication. For example, in the device identification unit 315, when position information of the wearable device 2 at a past time point and a position at which any of the image forming devices 1, 1, . . . is disposed are within a certain error range, the image data generating unit 312 determines that the wearable device 2 has performed short-range wireless communication with the image forming device 1. The fact that the wearable device 2 has performed short-range wireless communication with the image forming device 1 means that the user 200 has visited a place in which the image forming device 1 is disposed.

When the device identification unit 315 identifies the image forming device 1 that has performed short-range wireless communication with the wearable device 2 among the image forming devices 1, 1, . . . as described above, the image data generating unit 312 selects the image parts 301 corresponding to the identified image forming device 1 from among the image parts 301, 301, . . . and generates image data.

Alternatively, the device identification unit 315 conversely may refer to the file in which the history of the position information of the wearable device 2 stored in the HDD 32 is recorded and the file in which positions at which the image forming devices 1, 1, . . . are disposed are recorded and identify the image forming device 1 that has not yet performed short-range wireless communication with the wearable device 2. For example, in the device identification unit 315, when position information of the wearable device 2 at a past time point and a position at which any of the image forming devices 1, 1, . . . is disposed are not within a certain error range, the device identification unit 315 determines that the wearable device 2 has not yet performed short-range wireless communication with the image forming device 1. The fact that the wearable device 2 has not yet performed short-range wireless communication with the image forming device 1 means that the user 200 has not yet visited a place in which the image forming device 1 is disposed.

When the device identification unit 315 identifies the image forming device 1 that has not yet performed short-range wireless communication with the wearable device 2 among the image forming devices 1, 1, . . . as described above, the image data generating unit 312 selects the image parts 301 corresponding to the identified image forming device 1 from among the image parts 301, 301, . . . and generates image data.

The image data generated by the image data generating unit 312 is transmitted to the image forming device 1 that is performing short-range wireless communication with the wearable device 2 (that is, the image forming device 1 that is being operated by the user 200) from the network interface 35 via the network 4 under control of the data communication controller 313. The user 200 can operate the image forming device 1, display the image data on the display unit 161, and print the image data as necessary.

Next, a process performed when the image forming system 100 according to the present embodiment executes a game will be described. The image forming system 100 can be used for, for example, a game of reaching a goal through a plurality of designated checkpoints. For example, in the game, the image forming device 1 is disposed at checkpoints, and a game participant (the user 200) wears the wearable device 2 and operates the image forming device 1 at the checkpoints, performs a mission, and reaches a goal (final destination). The purpose of the game is to enable the game participant to acquire beneficial printed matter such as a coupon ticket, and whenever a predetermined mission is cleared and each checkpoint is passed, an image part of image data of the coupon ticket is newly provided, and complete image data of the coupon ticket is completed at a goal point and the data is printed.

Figure 6A:
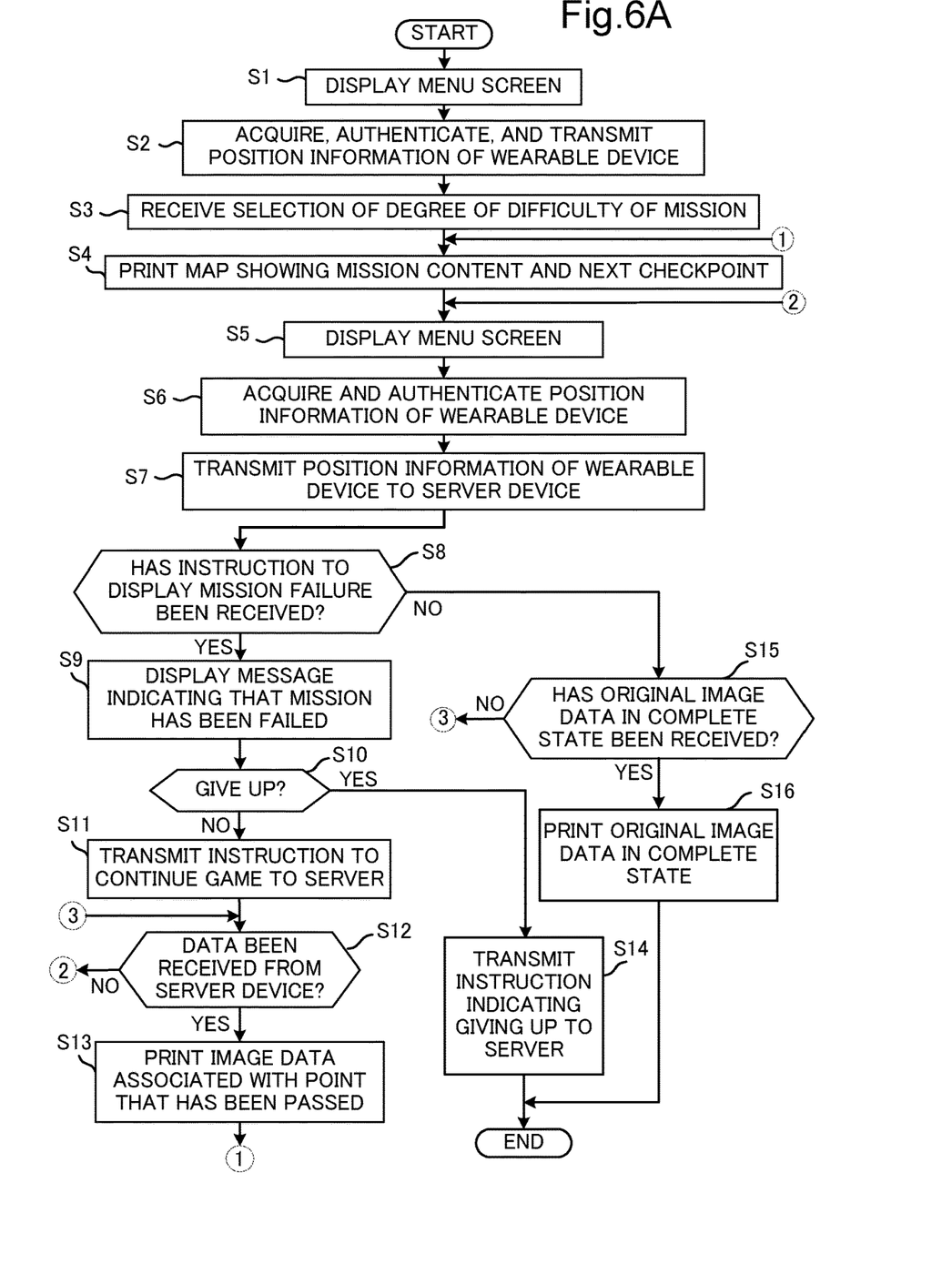
FIG. 6A is a flowchart showing a flow of a process when a game performed by the image forming device is executed.
Figure 6B:
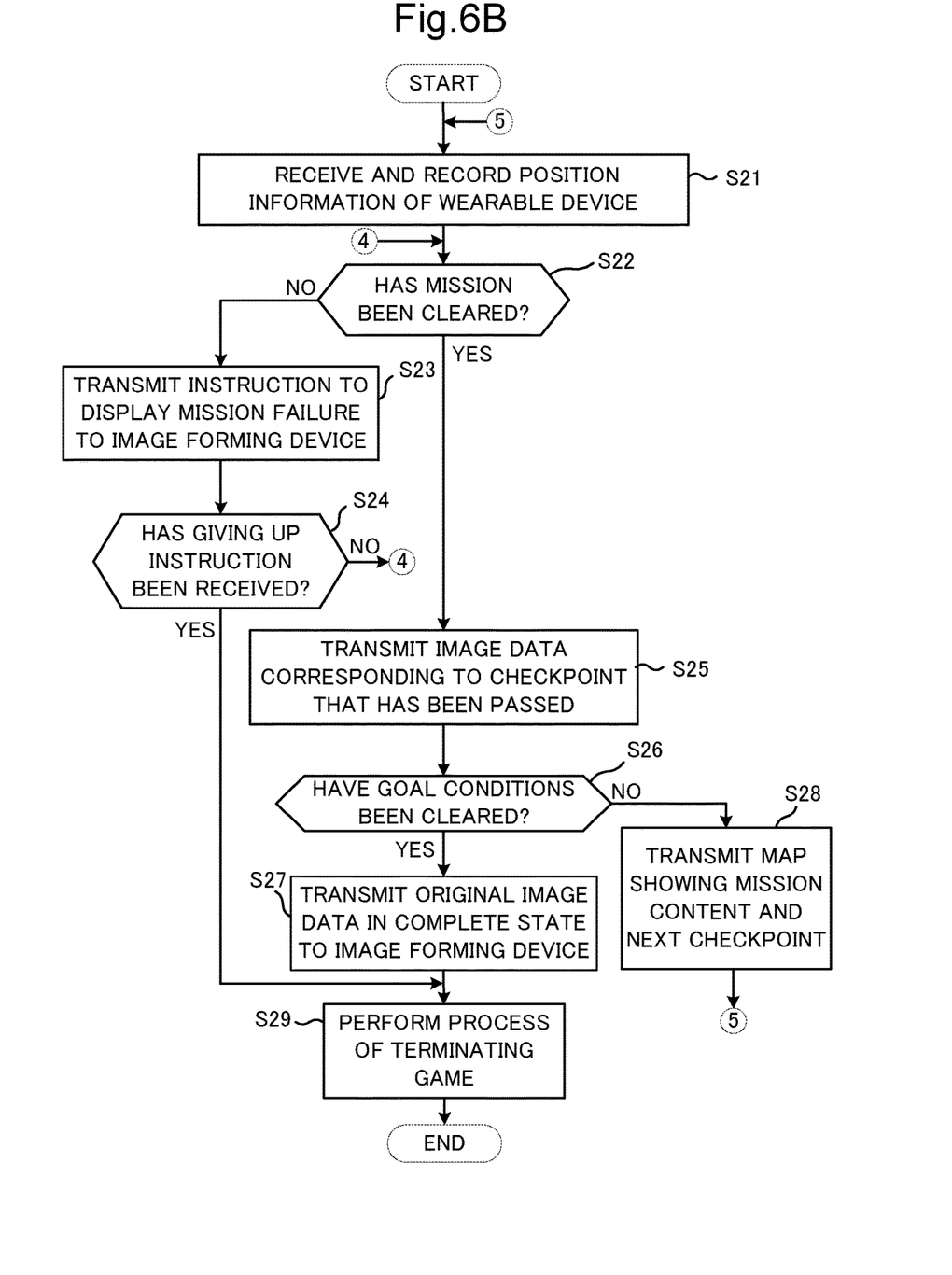
FIG. 6B is a flowchart showing a flow of a process when a game performed by a server device is executed.

FIG. 6A is a flowchart showing a flow of a process when a game performed by the image forming device 1 is executed. FIG. 6B is a flowchart showing a flow of a process when a game performed by the server device 3 is executed.

When the game starts, first, a game operator distributes the wearable device 2 and a map showing a first checkpoint to a game participant. Here, a plurality of places may be designated as the first checkpoint. In addition, the wearable device 2 is prepared by the game operator, and a possession of the game participant may also be used as long as it can be authenticated in the image forming system 100.

The game participant receives the wearable device 2 and the map and moves to the first checkpoint shown in the map. Then, the game participant operates the image forming device 1 at the first checkpoint and calls up a menu screen of the game. That is, the image forming device 1 receives an input of a menu screen call up instruction from the game participant through the operation unit 16 and displays the menu screen on the display unit 161 (S1).

At this time, the wearable device 2 and the image forming device 1 perform short-range wireless communication, and the controller 101 of the image forming device 1 receives position information from the wearable device 2 through the network interface unit 19 and authenticates the wearable device 2 (S2). The network interface unit 19 of the image forming device 1 transmits the position information of the wearable device 2 received by the image forming device 1 to the server device 3 (S2), and the network interface 35 of the server device 3 records the received position information of the wearable device 2 (S21).

The game participant operates the menu screen of the game displayed on the display unit 161 of the image forming device 1 and inputs an instruction to select a degree of difficulty of the mission to the operation unit 16. That is, the operation unit 16 of the image forming device 1 receives the input of the instruction to select a degree of difficulty of the mission (S3). When the operation unit 16 receives the degree of difficulty, the network interface unit 19 transmits information indicating the degree of difficulty to the server device 3. When the network interface 35 of the server device 3 receives the information indicating the degree of difficulty, the data communication controller 313 transmits a map showing mission content and the next checkpoint from the network interface 35 to the image forming device 1.

In addition, the controller 310 of the server device 3 determines the number of parts into which the original image data 300 provided to the game participant is divided whenever the mission is achieved according to the degree of difficulty. For example, when the original image data 300 shown in FIG. 5 is target image data, the controller 310 increases the number of parts into which the original image data 300 is divided as the degree of difficulty of the mission increases. That is, when the game participant does not pass through more checkpoints, it is not possible to obtain the original image data 300.

In addition, the game participant can operate the menu screen of the game and display target image data on the display unit 161 of the image forming device 1. When the game participant issues an instruction to display image data, the image forming device 1 requests image data from the server device 3. On the other hand, the server device 3 generates image data according to the history of the position information of the wearable device 2 and transmits image data to the image forming device 1.

Figure 7:
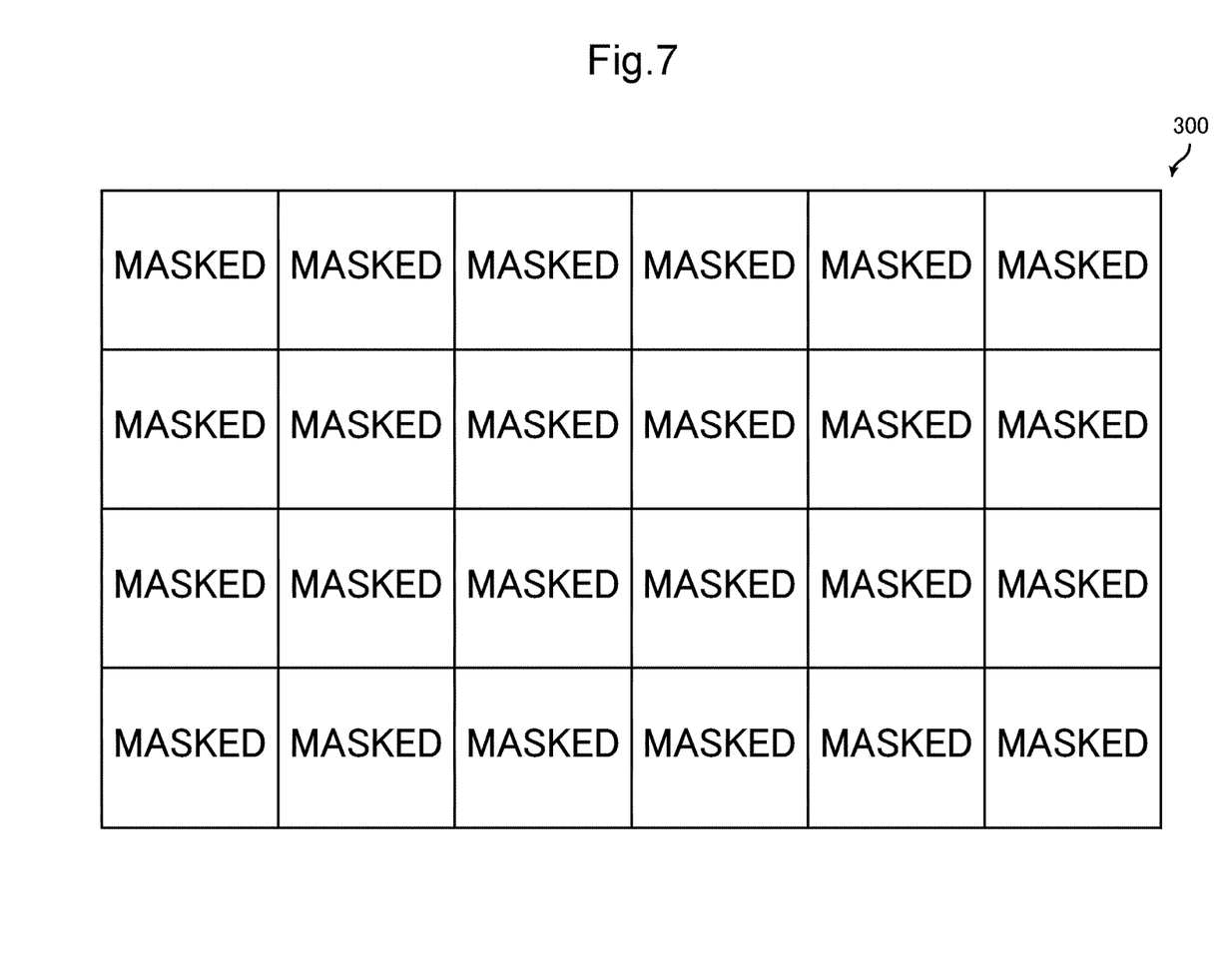
FIG. 7 is a diagram showing an example of image data when the game starts.

FIG. 7 is a diagram showing an example of image data when the game starts. When the game starts, since the game participant has not yet acquired image parts, the original image data 300 in which all image parts are covered with masks (shown as "MASKED" in the drawing) is displayed.

Returning to FIG. 6A and FIG. 6B, when the network interface unit 19 receives the map showing the mission content and the next checkpoint from the server device 3, the controller 101 causes the image forming unit 12 to print the map showing the mission content and the next checkpoint (S4). The game participant visually recognizes the printed matter, holds the printed matter, and moves to the next checkpoint.

While the game participant moves to the next checkpoint, the game participant performs the instructed mission. The mission is a predetermined engagement (task) that the game participant should necessarily perform in the game. For example, the mission is simply movement to the next checkpoint or obtaining a designated item (object). Here, for example, the item includes a simple IC chip attached thereto and has a configuration in which its own position information can be acquired and wirelessly transmitted to an external device as in the wearable device 2.

When the game participant arrives at the next checkpoint, he or she operates another image forming device 1 disposed at that place and calls up a menu screen of the game, that is, the other image forming device 1 causes the operation unit 16 to receive a menu screen call up instruction from the game participant and the controller 101 to display the menu screen on the display unit 161 (S5).

At this time, when the wearable device 2 and the image forming device 1 perform short-range wireless communication, the controller 101 of the image forming device 1 receives position information from the wearable device 2 through the network interface unit 19 and authenticates the wearable device 2 (S6). The network interface unit 19 transmits the position information of the wearable device 2 received by the image forming device 1 to the server device 3 via the network 4 (S7).

Then, in the server device 3, when the network interface 35 receives the position information of the wearable device 2, the controller 310 records the position information (S21).

Next, the controller 310 determines whether a mission has been cleared (S22). For example, when the mission is movement of the game participant simply to the next checkpoint, the controller 310 determines that the mission has been cleared if the position information received by the other the image forming device 1 from the wearable device 2 represents desired position information (position information of a correct checkpoint; here, position information indicating a position of the other image forming device 1).

Therefore, when the game participant visits an erroneous checkpoint, since the server device 3 cannot obtain the desired position information from the other image forming device 1, the controller 310 does not determine that the mission has been cleared.

In addition, when the mission is obtaining a designated item, the image forming device 1 receives position information thereof from the item and transmits the information to the server device 3. The controller 310 of the server device 3 determines that the mission has been cleared if the position information of the item represents desired position information (position information of a correct checkpoint; here, position information indicating a position of the other image forming device 1).

Here, when it is determined that the mission has been failed (NO in S22), the controller 310 of the server device 3 transmits a display instruction to display a message indicating that the mission has been failed from the network interface 35 to the other image forming device 1 as a process when the mission has been failed (S23).

In the image forming device 1, when the network interface unit 19 receives the display instruction (YES in S8), the controller 101 causes the display unit 161 to display the message indicating that the mission has been failed (S9). In this manner, when the mission has been failed, the server device 3 does not instruct regarding the next mission or the next checkpoint. On the other hand, in the case of NO in S8, the process proceeds to S15.

After it is determined that the mission has been failed, the server device 3 transmits an instruction from the network interface 35 to the image forming device 1, and the controller 101 of the image forming device 1 causes the display unit 161 to display a message asking the game participant whether to continue the game.

In this case, the controller 101 of the image forming device 1 causes the display unit 161 to display a selection image indicating whether to stop the game (whether to give up). Here, when the operation unit 16 of the image forming device 1 receives an instruction indicating giving up from the game participant (YES in S10), the network interface unit 19 transmits the instruction indicating giving up to the server device 3 (S14). In the server device 3, when the network interface 35 receives the instruction (YES in S24), a process of terminating the game is performed (S29). In this case, the game participant cannot acquire the original image data 300.

On the other hand, when the operation unit 16 of the image forming device 1 receives a game continuation instruction from the game participant (NO in S10), the network interface unit 19 transmits the game continuation instruction indicating that the game is to be continued to the server device 3 (S11). Then, the process proceeds to S5 via NO in S12.

In the server device 3, when the network interface 35 receives the game continuation instruction (NO in S24), the process proceeds to S22 without performing a process of terminating the game.

In addition, in the server device 3, when the controller 310 determines mission success (YES in S22), the device identification unit 315 identifies the image forming devices 1 disposed at checkpoints through which the game participant has passed so far on the basis of the history of the position information of the wearable device 2, the image data generating unit 312 selects image parts corresponding to the identified image forming devices 1 and generates image data, and the data communication controller 313 and the network interface 35 transmit the image data to the other image forming device 1 that is currently performing short-range wireless communication with the wearable device 2 (S25).

After the image data is transmitted, the controller 310 determines whether goal conditions have been cleared (S26). For example, the controller 310 determines that goal conditions have been cleared when it is determined that the game participant has performed all missions and passed all checkpoints.

Here, when the controller 310 determines that the goal conditions have not been cleared (other missions remain) (NO in S26), the data communication controller 313 and the network interface 35 transmit data indicating a map showing the next mission content and the next checkpoint to the other image forming device 1 (S28). After S28, the process proceeds to S21.

In the other image forming device 1, when the network interface unit 19 receives the image data in S23 and the above data in S25 (YES in S12), the controller 101 causes the image forming unit 12 to print the image data in S25, that is, image data associated with the point that has been passed (S13). Then, the process proceeds to S4, and the controller 101 causes the image forming unit 12 to print the data indicating a map showing the next mission content and the next checkpoint in S28 (S4). The game participant holds printed matter obtained by the printing and moves to the next checkpoint again. On the other hand, in the case of NO in S12, the process proceeds to S5.

Figure 8:
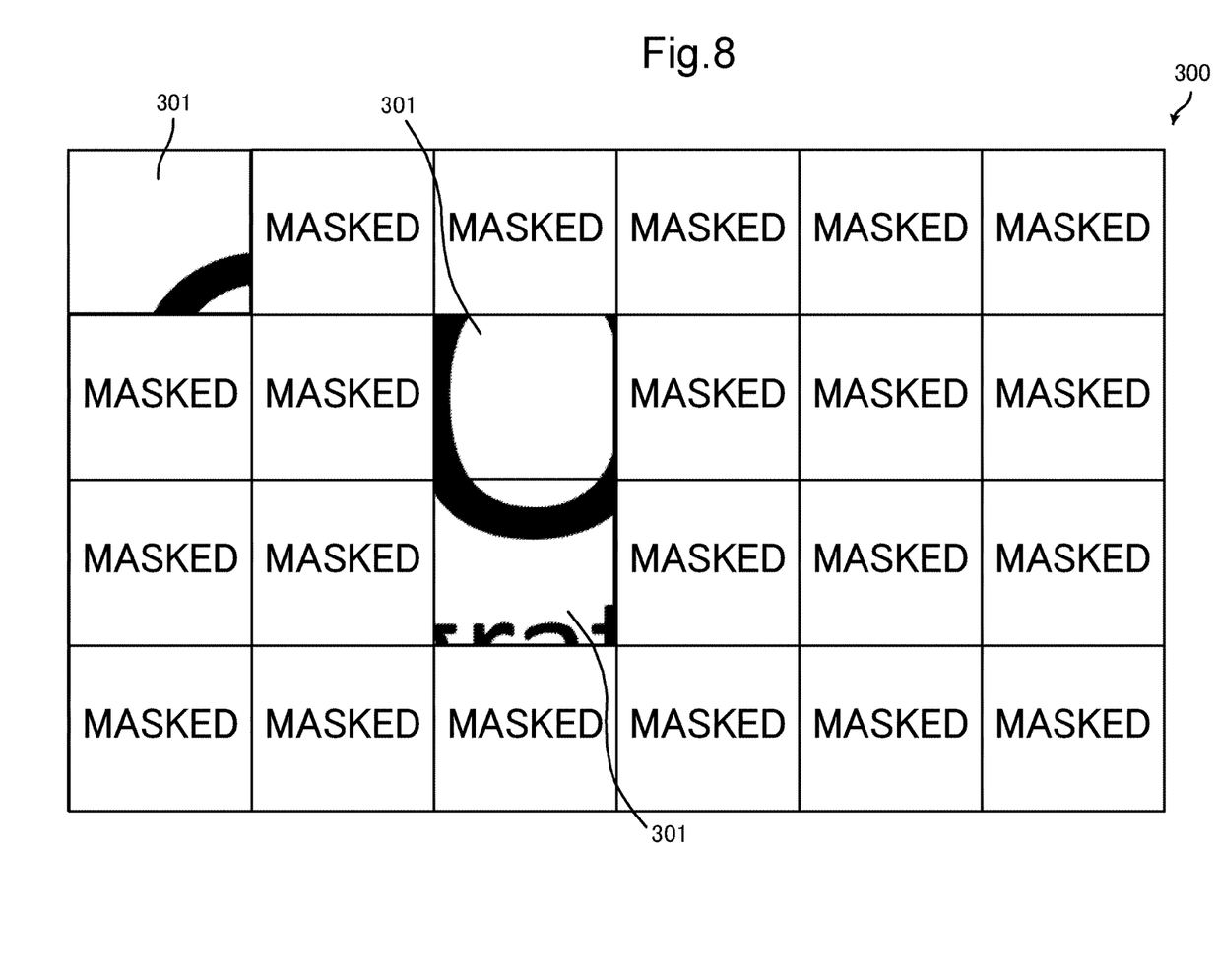
FIG. 8 is a diagram showing an example of image data when the game is in an early stage.

Here, an image indicated by the image data in S25 will be described. FIG. 8 is a diagram showing an example of image data when the game is in an early stage. For example, when three checkpoints have been passed, three image parts 301, 301, . . . are displayed.

Figure 9:
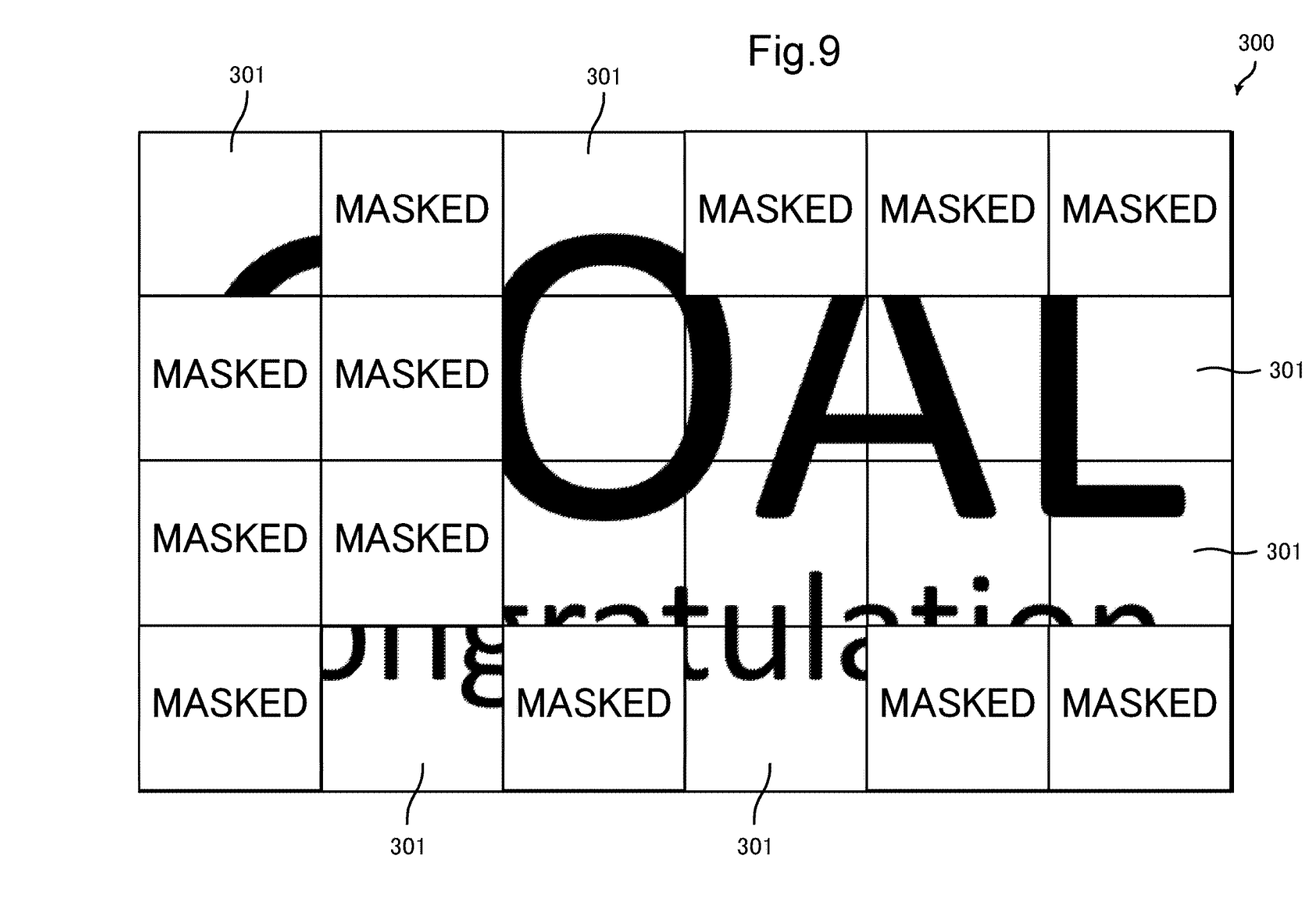
FIG. 9 is a diagram showing an example of image data when the game is in a middle stage.

As the game progresses, the game participant clears missions one after another, and whenever printed matter is obtained based on the image data in S25, the number of image parts 301 acquired by the game participant increases as shown in FIG. 9. FIG. 9 is a diagram showing an example of image data when the game is in a middle stage. For example, when 12 checkpoints have been passed, 12 image parts 301, 301, . . . are displayed.

On the other hand, in the server device 3, when the controller 310 determines that the goal conditions have been cleared (YES in S26), the data communication controller 313 and the network interface 35 transmit the original image data 300 in the complete state as shown in FIG. 5 to the other image forming device 1 (S27). The controller 310 performs a process of terminating the game (S29).

When the network interface unit 19 of the other image forming device 1 receives the original image data 300 (YES in S15), the controller 101 causes the image forming unit 12 to print the original image data 300 (S16). At this time point, the game is terminated. On the other hand, in the case of NO in S15, the process proceeds to S12.

Instead of the printing processes in S4, S13, and S16, the controller 101 may cause the display unit 161 to display image data which is a printing target in the processes of S4, S13, and S16. Alternatively, the controller 101 may allow performing both the printing and displaying.

Figure 10:
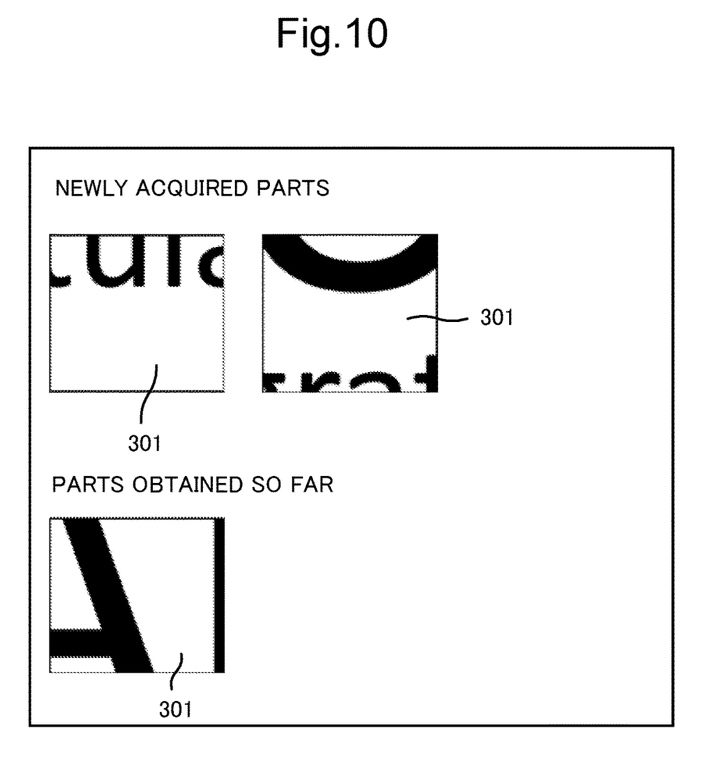
FIG. 10 is a diagram showing an example in which image parts are individually displayed.

Here, regarding the above image data obtained as the above printed matter whenever the game participant has cleared the mission, as a method of printing or displaying, image parts corresponding to checkpoints that the game participant has not yet visited are covered with masks as shown in FIG. 8 and FIG. 9, and also the server device 3 and the image forming devices 1, 1 . . . may individually print or display the acquired image parts 301, 301, . . . as shown in FIG. 10. For example, in the image forming devices 1, 1 . . . , according to the operation of the operation unit 16 by the game participant, dispositions of the image parts 301, 301, . . . are freely changed and displayed on the display unit 161 of the image forming device 1, and the controller 101 causes the image forming unit 12 to print the image data. In this case, when the game participant acquires all image parts 301, 301, . . . , and these parts are arranged correctly to form an image indicating the original image data 300, it is possible to determine that goal conditions have been cleared.

The image forming system 100 according to the present embodiment can be used for a printing service for maps and sightseeing maps using a multifunction printer (image forming device) provided in a convenience store, a hotel, and the like in addition to the game described above. For example, the server device 3 determines a place that the user 200 has visited from the history of the position information of the wearable device 2, and leaves places that the user 200 has visited in the surrounding area of the image forming device 1 blank, and can print only places that the user 200 has not visited. Accordingly, the user 200 can easily determine where to go for sightseeing.

Conversely, only places that the user 200 has visited in the surrounding area of the image forming device 1 may be printed, and places that the user 200 has not visited may be left blank. Accordingly, the user 200 easily recognizes places that he or she has actually visited in the surrounding area.

As described above, according to the present embodiment, when the user 200 wears the wearable device 2, visits each site, and operates the image forming device 1 disposed at the site, the user 200 can be provided with different types of print content according to a current geographical movement situation.

In addition, according to a general print control device, print permission or prohibition is controlled on the basis of position information of a mobile terminal when a printer is operated. However, a history in which the mobile terminal arrives at a current position via certain positions, in other words, a geographical movement situation of the user in which the user arrives at a current position (that is, in front of a printer) through certain places, is not reflected. Therefore, in the above general print control device, it is not possible to use a method in which it is not possible to obtain desired printed matter from the image forming device unless a plurality of determined places or sites have been passed.

On the other hand, in the present embodiment, it is possible to change print content according to the geographical movement situation of the user.

Here, the present disclosure is not limited to the configuration of the above embodiment, and various modifications can be made. For example, while a case in which a multifunction printer is used as an embodiment of the image forming device constituting the image forming system according to the present disclosure has been described in the above embodiment, this is only an example, and other image forming devices such as a printer may be used. In addition, a smartphone, a tablet terminal or the like can be used as a wearable device constituting the image forming system according to the present disclosure.

In addition, the configuration and process shown in the above embodiment using FIG. 1 to FIG. 10 are only an embodiment of the present disclosure, and the present disclosure is not limited to the configuration and process.

While the present disclosure has been described in detail with reference to the embodiments thereof, it would be apparent to those skilled in the art the various changes and modifications may be made therein within the scope defined by the appended claims.

What is claimed is:

1. An image forming system comprising:
a plurality of image forming devices that are distributed and disposed at each checkpoint and connected to one another via a network; and
a server device connected to the network and configured to transmit image data to an arbitrary image forming device among the plurality of image forming devices,
wherein each of the image forming devices includes a display unit configured to display the image data received from the server device on a screen, a printing unit configured to print the image data on paper, and a short-range wireless communication unit that is a module configured to perform short-range wireless communication of information including position information of a wearable device with the wearable device worn by a user,
the server device includes a CPU,
the CPU operating, in executing a communication control program, as:
a controller configured to perform overall operation control of the server device;
a position information history management unit configured to receive the position information of the wearable device through an image forming device performing short-range wireless communication with the wearable device and to manage a history of the position information of the wearable device;
an image data generating unit configured to generate image data associated with the history of the position information of the wearable device;
a data communication controller configured to transmit the image data generated by the image data generating unit to the image forming device performing short-range wireless communication with the wearable device; and
a device identification unit configured to identify an image forming device which has performed short-range wireless communication with the wearable device among the plurality of image forming devices on the basis of the history of the position information of the wearable device,
the image data generating unit selects an image part associated with the image forming device identified by the device identification unit among a plurality of image parts obtained by dividing original image data stored in advance into a plurality of parts and generates the image data to be transmitted to the image forming device by the data communication controller, the data communication controller transmits the generated image data to the image forming device that is performing short-range wireless communication with the wearable device at that time point, and the printing unit of the image forming device prints the image data on paper,
when the controller determines that a goal condition that the position information of all of the checkpoints is included in the history of the position information of the wearable device has been cleared, the data communication controller transmits the original image data in the complete state including all the plurality of image parts to the image forming device that is performing short-range wireless communication with the wearable device at that time point, and the printing unit of the image forming device prints the image data on paper, and
when the controller determines that the goal condition has not been cleared, the data communication controller transmits data indicating a map showing a next checkpoint among each of the checkpoints to the image forming device that is performing short-range wireless communication with the wearable device at that time point, and the printing unit of the image forming device prints the image data on paper.

2. The image forming system according to claim 1, wherein
the image forming device includes an operation unit configured to receive an input of an instruction to select a degree of difficulty of a mission and a network interface unit configured to transmit information indicating the degree of difficulty to the server device via the network when the operation unit receives the degree of difficulty, and
the server device includes a network interface configured to receive information indicating the degree of difficulty from the image forming device and a controller configured to determine the number of parts into which the original image data is divided according to the degree of difficulty indicated by the information received by the network interface.

3. An image forming system comprising:
a plurality of image forming devices that are distributed and disposed at each checkpoint and connected to one another via a network;
a wearable device that is worn by a user when used; and
a server device connected to the network and configured to transmit image data to an arbitrary image forming device among the plurality of image forming devices,
wherein the wearable device includes: a position information acquisition unit that is a module configured to acquire position information of the device itself; and a short-range wireless communication unit that is a module configured to perform short-range wireless communication with an arbitrary image forming device among the plurality of image forming devices,
the image forming device includes a display unit configured to display the image data received from the server device on a screen, a printing unit configured to print the image data on paper, and a short-range wireless communication unit that is a module configured to perform short-range wireless communication of information including position information of the wearable device with the wearable device, the server device includes a CPU, the CPU operating, in executing a communication control program, as:
- a controller configured to perform overall operation control of the server device;
- a position information history management unit configured to receive the position information of the wearable device through an image forming device performing short-range wireless communication with the wearable device and to manage a history of the position information of the wearable device;
- an image data generating unit configured to generate image data associated with the history of the position information of the wearable device;
- a data communication controller configured to transmit the image data generated by the image data generating unit to the image forming device performing short-range wireless communication with the wearable device; and
- a device identification unit configured to identify an image forming device which has performed short-range wireless communication with the wearable device among the plurality of image forming devices on the basis of the history of the position information of the wearable device, the image data generating unit selects an image part associated with the image forming device identified by the device identification unit among a plurality of image parts obtained by dividing original image data stored in advance into a plurality of parts and generates the image data to be transmitted to the image forming device by the data communication controller, the data communication controller transmits the generated image data to the image forming device that is performing short-range wireless communication with the wearable device at that time point, and the printing unit of the image forming device prints the image data on paper, when the controller determines that a goal condition that the position information of all of the checkpoints is included in the history of the position information of the wearable device has been cleared, the data communication controller transmits the original image data in the complete state including all the plurality of image parts to the image forming device that is performing short-range wireless communication with the wearable device at that time point, and the printing unit of the image forming device prints the image data on paper, and when the controller determines that the goal condition has not been cleared, the data communication controller transmits data indicating a map showing a next checkpoint among each of the checkpoints to the image forming device that is performing short-range wireless communication with the wearable device at that time point, and the printing unit of the image forming device prints the image data on paper.

4. The image forming system according to claim 3, wherein the image forming device includes an operation unit configured to receive an input of an instruction to select a degree of difficulty of a mission and a network interface unit configured to transmit information indicating the degree of difficulty to the server device via the network when the operation unit receives the degree of difficulty, and the server device includes a network interface configured to receive information indicating the degree of difficulty from the image forming device and a controller configured to determine the number of parts into which the original image data is divided according to the degree of difficulty indicated by the information received by the network interface.

* * * * *